Feb. 23, 1965  K. L. TATE ETAL  3,170,380
PRESSURE RESPONSIVE DEVICE
Filed June 11, 1962  4 Sheets-Sheet 1

INVENTORS
Kenneth L. Tate
Harry Stultz
Howard R. Jaquith
Richard G. Beach

FIG. 4.

INVENTORS
Kenneth L. Tate
Harry Stultz
Howard R. Jaquith
Richard G. Beach

United States Patent Office 3,170,380
Patented Feb. 23, 1965

3,170,380
PRESSURE RESPONSIVE DEVICE
Kenneth L. Tate, Harry Stultz, Howard R. Jaquith, and Richard G. Beach, Rochester, N.Y., assignors to Taylor Instrument Companies, Rochester, N.Y., a corporation of New York
Filed June 11, 1962, Ser. No. 201,627
20 Claims. (Cl. 92—10)

This invention relates to fluid pressure responsive devices, in particular to those of the liquid-filled type having flexible walls movable in response to fluid pressure applied thereto.

One specific object of the invention is to provide improved control of the effective area of the flexible walls of such devices.

Another specific object of the invention is to provide a novel sealing and mounting arrangement for a lever arranged to deflect angularly with one portion thereof in one environment, e.g., the interior of a pressure responsive device, and the remainder thereof in another environment, e.g., that exterior to the said pressure responsive device.

Yet another specific object of the invention is to provide improved control of the solidity of fill of liquid-filled pressure responsive devices without resort to the usual, demanding techniques suppose to be essential in providing substantially gas-free bodies of liquid fill occupying completely the interiors of such devices.

A general object of the invention is to provide a new and improved differential pressure responsive unit of the type having a pair of plate-like diaphragms forming a pair of movable walls in an otherwise substantially rigid-walled hollow body solidly filled with liquid, and wherein the pressure sensitivities of said walls are precisely balanced and said body provides means, including a seal and a pivotal mounting, permitting motion of the diaphragms to be transferred from the inner faces of the diaphragms, through the interior of said body and thence, via said seal, to the environment exterior to said body, there being a lever having one end rigidly connected to both aid diaphragms and lying therebetween, said lever being mounted by said pivotal mounting and extending through said seal to the environment exterior to said body.

Other objects of the invention will be evident upon inspection of the detailed description, to follow, and the claims appended hereto.

Figures 1, 5:
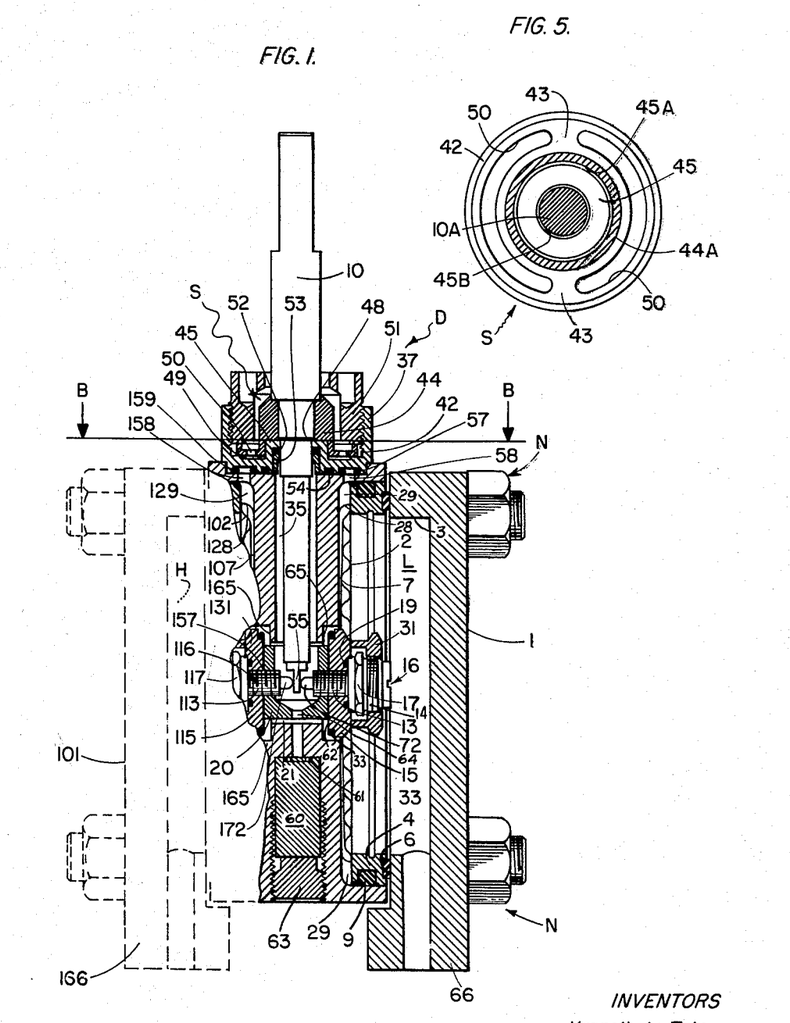
FIGURE 1 is a partial cross-section of a differential pressure unit according to the invention, the section being made as indicated by the section lines A—A, FIGURE 2.
FIGURE 5 is a section, somewhat enlarged, on line B—B, FIGURE 1.

In FIGURE 1, reference character D generally denotes a differential pressure responsive device according to the invention. The device D is bilaterally symmetrical with respect to the vertical plane normal to and bisecting the figure. Therefore, section A—A has been extended not much further than is necessary to reveal the internal structure on the right-hand side of the device, looking at FIGURE 1. It will be noted that left-side structure of the device D, as shown in FIGURE 1, is denoted in FIGURE 1, and in the other figures, by the same reference numerals as their right-side counterparts, except that the left-side structure numerals are just 100 larger than those of those of the right-side structure.

In FIGURE 1, reference character L represents the low pressure chamber of the novel differential pressure device D, chamber L being defined by a flange 1 and diaphragm 2, and chamber H being defined by a flange 101 and a diaphragm 102. As FIGURE 2 suggests, diaphragm 102 and, hence, diaphragm 2, are circular, hence, rim 3 of the flange 1 necessarily has a circular inner contour, though the flange 1, like flange 101, itself is generally square in outline. Diaphragm 2 is hermetically secured, as by welding, at 23 (see FIG. 3), continuously around its periphery to a mounting ring 4, circumferentially recessed at 5 to accommodate a circular gasket 6, the whole being received in a shallow cylindrical recess 7 in a body B. Mounting ring 4 also has a peripheral groove 8 accommodating an O-ring 9 which sealingly contacts the cylindrical wall 11 of recess 7.

Figure 2:
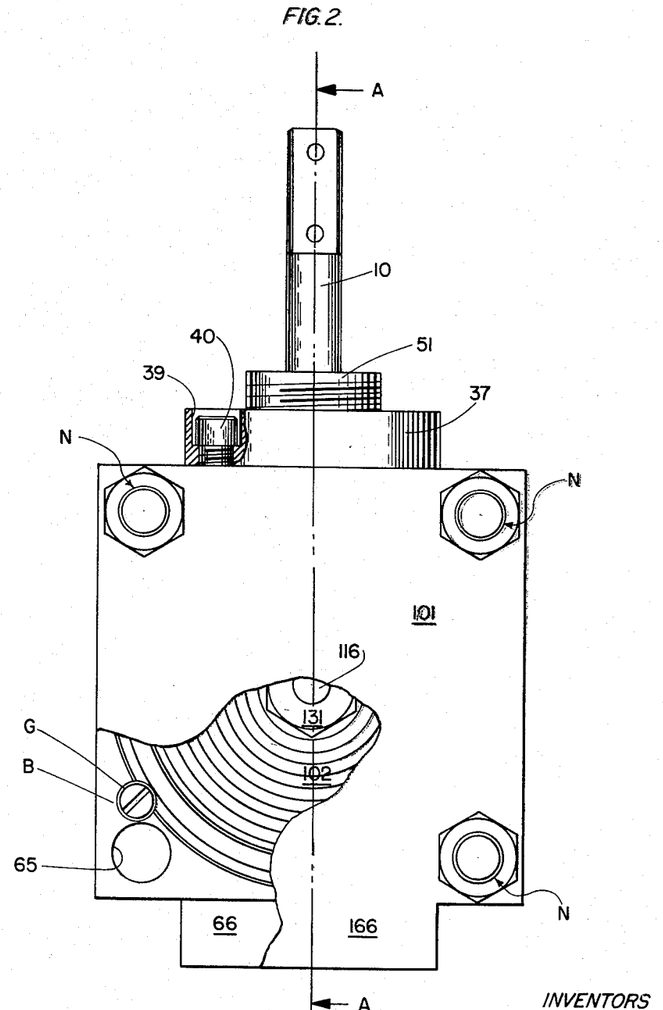
FIGURE 2 is an external view of the invention, partially broken away to show internal detail.
Figure 4:
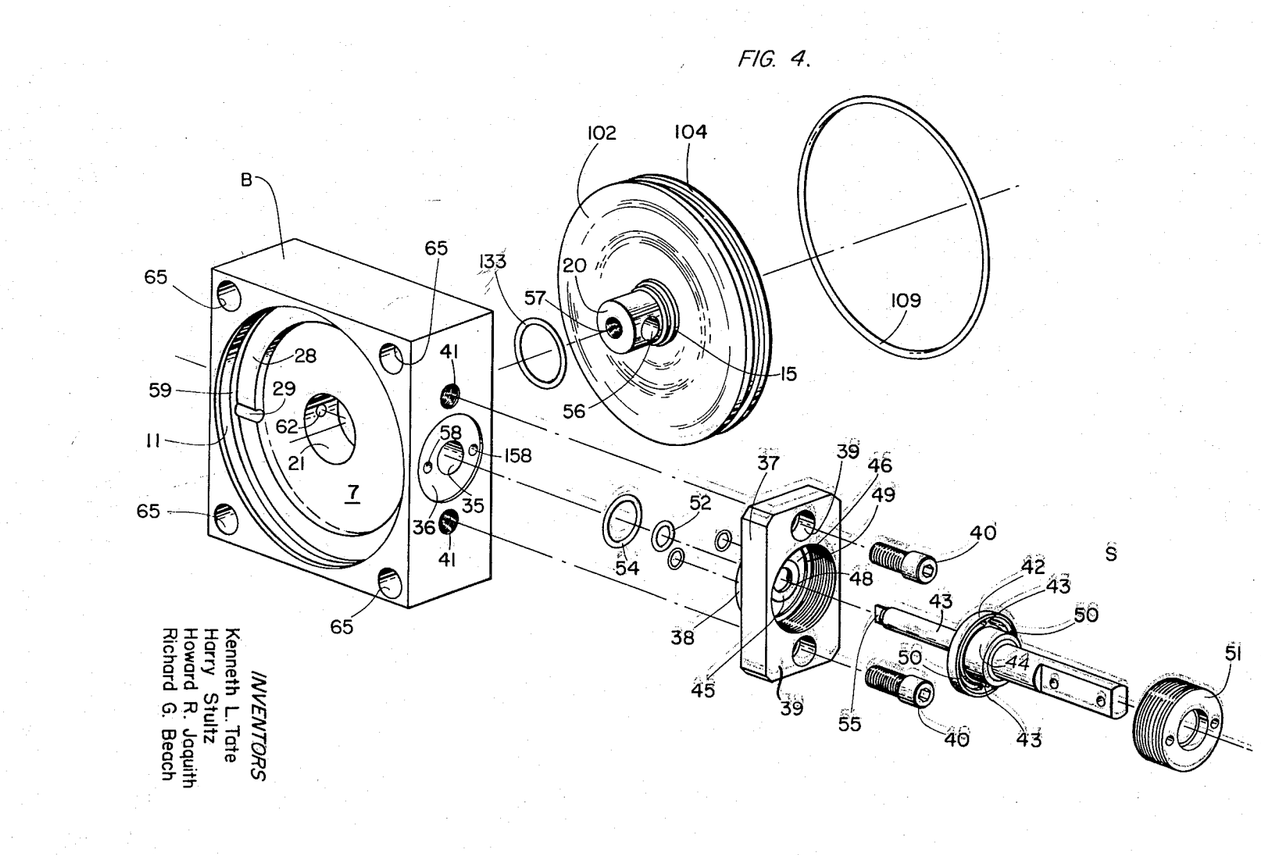
FIGURE 4 is an exploded view of the invention.

As is evident from FIGURES 2 and 4, which show much of the left-side structure of FIGURE 1, said left-side structure mirrors the right-side structure of FIGURE 1. Hence, the foregoing applies equally to diaphragm 102, flange 101, ring 104, etc.

In order to hold the several diaphragms, flanges and body B in assembled relation, suitable nut and bolt assemblies, generally indicated by the reference character N, are provided which clamp diaphragms, flanges and body B tightly together.

Diaphragm 2 is centrally-apertured at 12 (see FIGURE 3), such aperture being defined by the collar 15, to which the said diaphragm is hermetically secured, as by welding, at 70, continuously around the periphery of said aperture. Collar 15 also slidably receives a double-threaded bolt 16 having a hexagonal flange 17 to permit application of a wrench thereto, an O-ring 19 being provided between flange 17 and the collar 15 to prevent leakage of fluid between bolt 16 and collar 15.

The left-hand, narrower end 13 of bolt 16 threads into a cylindrical spool 20 located in a bore 21 in body B.

Since the structure described thus far is duplicated on the H side of the device, diaphragms 2 and 102 are obviously rigidly linked together. As will appear hereinafter, the space in the body B between diaphragms 2 and 102 is sealed from the environment external to the body. At the same time, said space will be solidly filled with a gas-free, inert liquid, which will be everywhere bounded by what amount to rigid walls except at the corrugated portions of the diaphragms.

In use, it is contemplated that one fluid pressure will be admitted, via a connection 166, to chamber H, and another, via a connection 66, to chamber L, whereby the spool 20 will be deflected to the right or to the left, in accordance with the magnitude of difference and the sense of such difference, between the said pressures.

If the diaphragms 2 and 102 were secured directly to the body B without the intervention of rings 4 and 104, or equivalent, separate mounting element, it would be difficult to precisely control the effective areas of the diaphragms. For example, if the device were disassembled for maintenance, and it were necessary to disturb the diaphragms, it would be very probable that the diaphragms would have different effective areas. Re-calibration of the device would be necessary, and probably it would be necessary to adjust the effective area of one diaphragm with respect to the other. It will be appreciated, too, that the manufacture of the device necessarily includes adjustment of effective area. In either case, it is obvious that clamping the diaphragm directly between flange and body will have an uncertain effect on the effective area of the diaphragm, having in mind manufacturing practice and reasonable tolerances.

According to the present invention, however, if the diaphragms 2 and 102 are secured, as by welding, to their mounting rings 4 and 104, and their effective areas are made to depend on the said rings, the acts of assembly and/or disassembly of the device will have substantially no effect on effective area insofar as the outer peripheries of the diaphragms are concerned. Hence, the effective areas of the diaphragms may be precisely determined before assembly with the knowledge that the diaphragms will have the same effective areas after they have been clamped to body B. Therefore, the diaphragms 2 and 102 may be matched to each other before assembly to the body B, after they have been secured to their mounting rings, for after assembly to the body B, they will still be matched.

Figure 3:
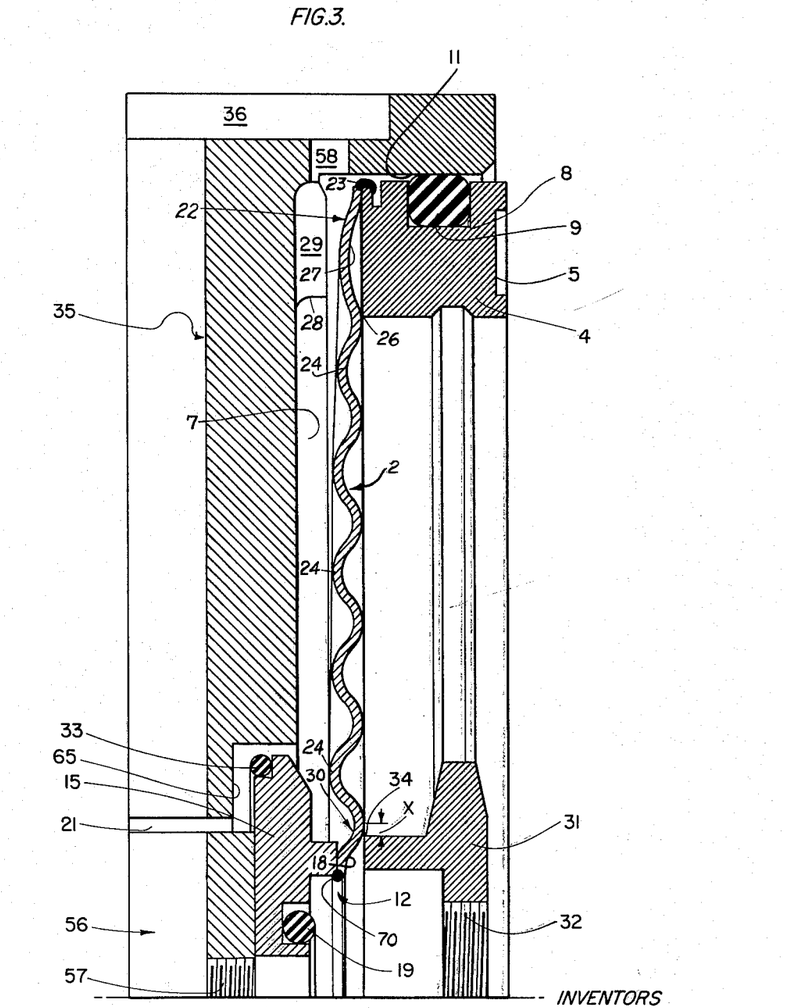
FIGURE 3 is an enlargement of part of the upper-right-hand quadrant of FIGURE 1.

FIGURE 3 illustrates how the ring 4 is utilized in fixing the effective area of diaphragm 2, the parts being shown slightly exploded, in the main, for clarity. For the purposes of this application, the corrugations of the diaphragms 2 and 102 are viewed as the annular protuberance visible from the diaphragm sides facing body B, whereas the view from their opposite sides is considered to be of the concave sides of the same corrugations. Thus, diaphragm 2, FIGURE 3, is shown as having seven corrugations, including five interior corrugations 24, as innermost corrugation 18 and an outermost corrugation 27, the leadlines of numerals 18 and 27 being extended to the concave sides of corrugations 18 and 27, and the leadlines of the numerals 24 being extended to the convex sides of corrugations 24.

Looking at FIGURE 3, it will be observed that the diaphragm 2 generally consists of a peripheral section, generally indicated at 22, welded to ring 4 at 23, and an annular compliant section consisting of the corrugations 24. The section 22 is intended to be rigidly fixed in place when the flange 1 and body B are clamped together.

The boundary between the compliant section and section 22 is fixed by means of the innermost edge 26, of ring 4, which edge should be quite sharp (for example, having a maximum radius of 0.005 in.), so that when the flange 1 is assembled to the body B, and bolt and nut assemblies N are tightened, the outermost corrugation 27 of diaphragm 2 will be flattened out between the ring 4 and a flat circular ledge 28 (see FIGURE 4) facing the ring 4, extending around the periphery of the bottom of recess 7, and forming an integral part of body B. The diaphragm being of elastic material and resistant to change from the corrugated shape shown in FIGURE 3, it will react to flattening corrugation 27 with a peripheral stress that will force the surface of the diaphragm into contact with the edge 26 of ring 4.

As a result, the boundary between the fixed portion 22 of the diaphragm and the compliant portion thereof will be very sharp, and will remain fixed whenever there is contact between edge 26 and the diaphragm, even though the corrugation 27 is not perfectly flattened out. Depending on the curvature of the corrugations involved, the spring rate of the diaphragm, the number of corrugations, and so on, diaphragm 2 will be able to flex to the left a certain distance without edge 26 losing contact with the diapragm surface. In this case, the contemplated use of the differential pressure device is as part of a force-balance relay device wherein the force due to differential pressure is countered by an opposing force which always restores the diaphragm 1 to very nearly the position it has when the differential pressure is zero, hence, loss of diaphragm contact with edge 26 is unlikely, even on over-range, and is of little concern here. Even if contact were lost due to over-deflection, the diaphragm is tightly clamped, hence, contact will be restored, without change in effective area, when the pressure returns to values within the range corresponding to deflections within the aforesaid certain distance.

The edge 26 takes care of the outermost boundary of the compliant part of diaphragm 2. However, where (as here) the diaphragm is provided with a rigid central element or portion of some sort, it is again of concern to sharply and stably define the boundary between the central element or portion and the compliant part of the diaphragm. According to the invention, the boundary between the collar 15 and the compliant part of the diaphragm is defined by the same expedient adopted in the case of the outer peripheral part of the diaphragm.

Turning again to FIGURE 3, the central, apertured portion of diaphragm 2 is welded to collar 15 at 70, hence, the diaphragm has an inner portion, located generally at 30, which is intended to be rigidly maintained in place between a nut 31 and collar 15. As in the case of the outer peripheral portion of the diaphragm, a sharp and stable demarcation between portion 30 and the compliant portion of the diaphragm can be created by a sharp edge member bearing on the surface of the diaphragm adjacent the aperture 12 and substantially continuously therearound.

Such edge is provided by the nut 31, threaded at 32 to receive the outer, larger-diameter threaded portion 14 of bolt 16, and having a sharp outer peripheral edge 34 at the end thereof adjacent the diaphragm surface. Nut 31 is screwed down on bolt 16 (omitted in FIGURE 3) to flatten out the innermost corrugation of the diaphragm, whereby to cause the diaphragm to be stressed against the edge 34. Obviously, the same considerations hold for edge 34, the diaphragm, etc., as for edge 26, the diaphragm, etc.

As is suggested by FIGURE 3 (which is substantially of the relative proportions of actual construction, but with flange 1 omitted and the nut 31 backed off slightly from final assembly position), corrugations 18 and 27 are conveniently made somewhat shallower than corrugations 24, since when the parts involved are in the state of final assembly, nut 31 and ring 4 will be spaced from, respectively, collar 15 and ledge 28, by substantially only the thickness of the diaphragm material in the region of corrugations 18 and 27.

The area-defining edges 26 and 34 should lie on the slope of the corrugations contacted thereby, e.g., edge 34 lies a distance X from the peak of the contacted corrugation, according to FIGURE 3, which also reveals that edges 34 and 26 overhang the corresponding edges of collar 15 and ledge 28, respectively. Hence, when nut 31 is screwed down and flange 1 is clamped to body B, edges 26 and 34 will immediately establish proper contact with the diaphragm 2, without interference, and will remain in this state throughout the contemplated range of deflection of diaphragm 2.

As before, what has just been said as to diaphragm 2 and the manner of fixing its effective area, applies exactly to diaphragm 102, exactly the same structure being provided, including edges corresponding respectively to edges 26 and 34, and so on, in the case of diaphragm 102.

As is known, the radius of the effective area of such a diaphragm can be thought of as extending from the center of the diaphragm to a point somewhere between the inner and outer boundaries of the compliant section. Therefore, if the radial width of the compliant section be increased by decreasing the diameter of the nut 31, at the edge 34, the effective area of the diaphragm will be decreased, and vice versa, if the nut diameter, at the edge 34, be increased.

Hence, the nut 31 offers a very convenient means for balancing the diaphragms 2 and 102, particularly since it obviates any necessity for attempting to very closely match a pair of diaphragms, after they have been mounted on their rings. Thus, production-run lots of ring and diaphragm assemblies may be graded into several groups, each group having diaphragm and ring assemblies therein falling within a group range of effective area that differs from the group range of each other group. Then, in the manufacture of the device D, pair of diaphragm and ring assemblies may be picked from the same group, tested for match, and then trimmed to match almost exactly by proper choice of the nut 31 of diaphragm 2 and/or its counterpart nut 131 of diaphragm 102. The device D may thereafter be disassembled and reassembled without the diaphragms becoming unmatched. Furthermore, unmatching that might occur can be eliminated by substituting a nut 31 or 131 of appropriate diameter.

The need for matching is because a certain symmetry, as between diaphragms 2 and 102, must exist for proper operation of the differential pressure responsive device illustrated.

Succinctly stated, it is desirable that each of the two diaphragms, in situ in the assembled unit, have the same sensitivity to a given change in pressure, as has its fellow. This would be the case, had each diaphragm the exact same dimensions and elastic properties as the other, and the effect, if any, of the manufacturing process resulting in the assembled unit, was exactly alike on each diaphragm. In practice, dimensions and elastic properties will vary enough that it is not feasible to match diaphragms by choice from a production run, and it would be useless to try to do so if assembling the device had an effect on diahpragm sensitivity.

Obviously, however, in the present invention, the diaphragms 2 and 102 may be balanced very exactly by choosing a nut 31 for the former having the proper diameter at its edge 34, and/or, of course, by applying the same expedient in the case of the latter. The actual effect is change in both effective area and compliance of the compliant section of the diaphragm (the latter factor being considerably lesser than the former, however). The larger the diameter of the edge 34, the greater the effective area and the lesser the compliance, and vice versa. Since the compliance changes, the change in sensitivity to a given pressure change resulting from a nut change may be slightly less than would be expected were effective area change the only effect consequent upon nut change.

Preferably, imbalance between the diaphragms is determined by applying what amounts to zero differential pressure to the device of FIGURE 1 at a pressure level of suitable magnitude, say as much higher that atmospheric pressure as may be expected in actual use of the device. Conveniently, the device of FIGURE 1 may be semi-assembled in a test jig, which clamps rings 4 and 104 to body B without preventing access to nuts 31 and 131 (as would flanges 1 and 101, if assembled to the device also). Then, a test pressure is applied between the diaphragms. At this moment, any net motion of the diaphragms indicates imbalance. If the motion is to the left, say looking, at FIGURE 1, one may either replace the nut 31 with one having a smaller diameter at edge 34, and/or replace the corresponding nut 131 of diaphragm 102, with one having a larger diameter at its edge corresponding to edge 34. The proper nut or nuts having been chosen, which will be indicated by the fact that when said nut, or nuts, is or are assembled to the bolt 16 and/or bolt 116, and tightened down on the diaphragm, or diaphragms, re-application of the test pressure, between the diaphragms, will not result in any net motion of the diaphragms, then the pair of ring and diaphragm assemblies may be incorporated into a device D, such as shown in FIGURE 1, without affecting the balance between the diaphragms 2 and 102.

The diaphragm motion, for the purpose of the test, may be detected in any suitable way which, as it forms no part of the invention, need not be exemplified here. The motion to be detected would be that of the rigid structure moved by the diaphragms 2 and 102, that is, the effectively-integral, rigid assembly constituted by bolt 16, nut 31, collar 15 and their counterparts in the left-side structure, and including spool 20.

As will be described more fully infra, the device D is to confine a body of liquid between diaphragms 2 and 102. Since, in general, such liquid will have an appreciable coefficient of cubical expansion in response to change in its temperature, such expansion will result in a net deflection of spool 20 to the extent that the diaphragms 2 and 102 are not of equal sensitivity with respect to pressure change. Obviously, the nuts 31 and 131 provide a most precise, stable and facile expedient for balancing the diaphragm sensitivities sufficiently to substantially completely obviate, not only error due to thermal expansion of liquid, but all errors originating in unbalance between the diaphragms.

Corrugations 18 and 27 are termed such mainly to establish a distinction between prior art diaphragms the peripheral margins (inner and/or outer) of which are planar in the free or unmounted condition of the diaphragm and are intended to be clamped between like flat surfaces, with the result that no peripheral stresses arise, such as to arise in diaphragms 2 and 102 and create deflection of the diaphragm surface against area-determining edges 26, 34, et al., at zero pressure difference across the diaphragm. Thus, corrugation 27 may be quite shallow, compared to corrugations 24, and though circular or closed, like corrugations 24, its cross-sectional contour is immaterial, whereas the cross-sectional contour of the corrugations 24 are to be determined in accordance with the usual considerations having to do with the response of the diaphragms to fluid pressure thereon, when clamped in place in the device D. Likewise as to corrugation 18, except that corrugation 18 is in reality little or no more than half a "corrugation" since all it need be is a slight upset out of the general plane of the diaphragm next adjacent the innermost corrugation 24. The reason that corrugation 18 is a half-corrugation, so to speak, and corrugation 27, a full one, is that the former is not bonded to its area determining element 31, whereas the latter is. Conceivably, this situation could be reversed, that is, the corrugation 27 could be welded to ledge 28, in which case the outermost half of the corrugation would not have to be provided.

On the other hand, nut 31 could be welded to corrugation 18, which would mean that the latter would have to have its missing half provided, i.e., would have to be a full corrugation in the sense that corrugation 27, as shown, is a full corrugation. In such case, final adjustment would require providing a plurality of rings 4 of various inner diameters with respect to edge 26. Also, some sort of a gasket would have to be provided between ring 4 and the diaphragm, or the diaphragm would have to be welded to the body B, in the case of a device such as shown herein.

It will be evident to those skilled in the art that numerous variations of the kind just described are possible, and that these will be desirable or not, depending on the nature of the pressure responsive device in which the area-defining expedient of sharp-edged mounting structure be used. For instance, in the present case, the welds 18 and 28 are preferred to gaskets, O-rings, and the like because the pressure chamber L, as a result, is, save for the gasket 5, bounded entirely by integrally-joined metallic elements and substantially proof against deterioration by deleterious materials such as might constitute or be included in the fluids such as would be admitted to chambers L and H. Moreover, there is no non-integral seal between the interior of body B and the chamber L except that of O-ring 9 and the gasket in groove 5, which constitute a double-seal, from between which leakage of the fluid in chamber L can escape to the external environment between body B and flange 1, more easily than it can infiltrate past O-ring 9 into the body B.

The foregoing applies, of course, to the left-hand side of the device D. Further, since the device D does involve a two-diaphragm arangement, including a sealed body of liquid, it is obvious that assembly and maintenance are best served by making the welded connnections, of diaphragms 2 and 102, to collars 15 and 115 and rings 4 and 104, rather than to the body B and nuts 31 and 131.

In order to utilize the motion of the diaphragms 2 and 102, a force beam 10 is provided which may correspond to force beam 10 of the transmitter unit described and claimed in the copending application of H. R. Jaquith and K. L. Tate, S.N. 192,164, filed May 3, 1962, now Patent No. 3,160,007, and assigned to the assignee of the present application, which discloses a pneumatic servo-relay unit having a baffle and nozzle arrangement capable of detecting extremely minute movements, or of equivalent means for transforming motion and/or force into a useful output of some sort.

To accomodate beam 10, body B has a cylindrical bore 35 and is countersunk at 36 where bore 35 emerges at the outer surface of body B. A rigid block 37 having a cylindrical projection 38, fitting in the countersink 36, and a pair of through holes 39, providing for rigidly clamping block 37 to body B by a pair of bolts 40 threading into body B at 41, is provided in order to mount beam 10 and, as will be seen later, in order to provide for "pour filling" of the space in body B between diaphragms 2 and 102.

Beam 10 has, rigidly affixed thereto, a stay plate S consisting of a cylindrical collar 42 attached by means of webs 43 to a cylindrical sleeve 44. Conveniently, the stay plate is machined out of a cylindrical block of steel, with the sleeve 44 of sufficiently large diameter (at the end thereof obscured from view in FIGURE 4) as to receive a sleeve-like projection or nipple 45 at the bottom of a cylindrical recess 46 in block 37. The near end of sleeve 44, (looking from the point of view of FIGURE 4) is conveniently welded to beam 10, all around its circumference.

At the same time, the nipple 45 is lipped inwardly at 48 to receive beam 10. The stay plate's collar 42 rests on a circular ledge 49 surrounding the bottom of recess 46 (see FIGURE 1), the ledge 49 being sufficiently narrow that the webs 43, defined in the larger end of the stay plate by means of slots 50, completely clear the ledge 49, by a substantial margin.

The cylindrical wall of the recess 46 is threaded to receive a threaded nut 51 which clamps collar 42 of the stay plate S between one end of the nut and ledge 49.

Nipple 45 accommodates an O-ring 52 about beam 10. A retainer sleeve 53 retains O-ring 52 in place between itself and lip 48. Also, the projection 38 of block 37 has a circular groove therearound, receiving an O-ring 54, that seals between the outer end of bore 35 and the bore defined by sleeve 45, when block 37 is clamped to the body B.

It will be evident from FIGURE 1 and the foregoing subscription that, when beam 10 and block 37 are assembled to the body B, that the parts involved fit relatively snugly. Moreover, the webs 43, though located at opposite ends of a diameter of collar 42, are quite stiff, hence, for many purposes body B and beam 10 form a practically rigid assembly, especially where deflection of the beam 10 is concerned. It is quite obvious, for example, that beam 10 is practically proof against being extruded from body B when the diaphragms 2 and 102 are subjected to pressures admitted to chambers H and L, and that webs 43 would not permit beam displacement in the plane of the diameter on which said webs are located.

Furthermore, though beam 10 and O-ring 52 nevertheless necessarily define an effective area that displaces itself some minute amount in response to the pressure reigning between diaphragms 2 and 102, the axis defined by webs 43 bisects this effective area, hence, the internal pressure cannot reduce any force unbalance with respect to said axis, Unbalance in this respect, of course, would produce a net deflection of beam 10 about said axis, which deflection would be a function of the difference between the pressure created inside the body B by the pressures incident on diaphragms 2 and 102, and the pressure external to the device D, As a result, the movements of beam 10 are practically confined to relatively small deflections thereof about the axis defined by webs 43.

Obtaining large deflections of beam 10 is not of concern here. In the first place, it is desirable to minimize the deflections of diaphragms 2 and 102. The less spool 20 can move, the smaller the volume between the diaphragms need be, the less is the demand on the diaphragms insofar as are concerned life and excellence of elastic properties thereof, and the more nearly perfect are the elastic properties of webs 43, with respect to torsion thereof on their common diameter as an axis.

In the second place, the rigidity and ruggedness, which is required for service at high pressure levels, can be more easily obtained if it is not necessary to produce considerable output directly from the diaphragms (made of stainless steel, in a typical case), which may, therefore, be relatively stiff. In a typical case, diaphragms 2 and 102 and the webs 43 of stay plate S may be of the same order of stiffness. Additional stiffness, if needed, is provided by means of an added spring (not shown) applied to beam 10 externally of device D.

In the third place, suitable relay or transmitter devices are available that are capable of translating minute forces or motions into as large and/or powerful signals (electric, pneumatic, hydraulic, etc.), as one pleases.

It is sufficient, for our purpose, if beam 10 deflects as much as is permitted—about one degree—by about 0.003" clearance between sleeve 45 and retainer 53, on the one hand, and the next-adjacent part 10A of beam 10, on the other hand. O-ring 52 both centers lever 10 in nipple 45 and is prevented from blowing out of the nipple, due to the narrow clearance. Again, ledge 49 holds the stay plate above the end surface of nipple 45, about 0.04", say, where it lips over, to form lip 48, and lets webs 43 warp, under torsion, out of the plane of the end of stay plate S, without contacting the bottom of recess 46, which they clear by about 0.03". Finally, the inner diameter of nipple 45 at its lipped end, and the inner diameter of the sleeve 44, (where it embraces nipple 45), each then may be about 0.01" larger than the diameter of the next adjacent entity it surrounds, namely, beam portion 10A and nipple 45, respectively. Hence the upper end of beam 10 is perfectly free to deflect enough to operate motion detectors, such as baffle and nozzle devices, and the like.

The section shown in FIGURE 5 (which omits nut 51 and most of block 37) illustrates, at 45B, the spacing involved as between beam 10 and nipple 45 and, at 45A, the spacing involved as between nipple 45 and the cylindrical lower part 44A, of sleeve 44. Furthermore, FIGURE 1 indicates a substantial spacing between collar 42 and the threaded wall of recess 46 in block 37. On the other hand, O-ring 52 snugly fits beam 10, and therefore centers beam 10 in nipple 45 when the beam 10 is inserted in the body B, the various clearances described above permitting the beam 10 and stay plate S to accommodate themselves to block 37 before nut 51 is screwed down on collar 42.

The ledge 49, the lower surface of collar 42 (where it contacts ledge 49), the upper surface of collar 42 and the lower surface of nut 51 (where it contacts the said upper surface of collar 42) are finished off quite flat so that said collar is uniformly clamped about its periphery by the nut 51.

The end of beam 10 has a flatted lower end 55, extending through a side bore 56 in spool 20 into an axial end bore 57 therein. Screw 16 has its inner threaded end 13 threaded into axial bore 57 of spool 20. Likewise for screw 116, its inner threaded end 113 and the other end of bore 57 of spool 20. In addition, screws 16 and 116 have, respectively, round-ended contact studs 72 and 172, the round ends of which are tangent to the flats of flatted end 55 of beam 10, said studs being permanently, or temporarily, rigidly fixed to said screws. By reason of this symmetry, the high and low pressure connections of the device D can be reversed, the low pressure chamber L becoming the high pressure chamber, and the high pressure chamber H becoming the low pressure chamber. Since, in practice, some external bias (not shown, but suitably a spring of some sort) is necessary to take up an unavoidable play between the flat of end 55 that is supposed to be in engagement with one of contact studs 72 and 172, reversal of pressure connections would require reversal of said bias.

In order to minimize distortion of the O-ring 52, when lever 10 deflects, the dimensions of the stay plate S of sleeve 45 are such that O-ring is at or very close to the axis of deflection of beam 10. This axis is on a diameter of stay plate S, through the webs 43.

It will be observed that the combination of the stay plate, O-ring seal in nipple 45, and the mode of connection of diaphragms 2 and 102, unite to provide a device that forms a quite rugged, immobile structural arrangement, that is both easy to adjust, yet leak-free, and is quite linear and hysteresis-free with respect to the motions involved since there is little net diaphragm motion and only a very slight torsional deformation of webs 43, in operation.

The same structure lends itself very readily to pour-filling, so-called. Devices of the type involved here are liquid-filled as part of the manufacturing process, in conformance with a high standard of gas freeness, since if the liquid-fill, or the volume it is supposed to fill, in the device, is not substantially gas-free, the device will not operate properly, as is well-known. Hence, the users of such devices are reluctant to service them in the field if it means getting at the space supposed to be liquid-filled. If this is nevertheless done, it means, insofar as the prior art is concerned, that the device must be refilled much as when it was manufactured, which rules out field filling, and requires either that the device be returned to the manufacturer for filling, or that the user have a suitable filling facility.

To fill the device of the present invention, it is merely necessary to position the device D (assembled but for block 37 and the structure normally affixed thereto) with axis of bore 35 vertical, and the countersink 36 up, and pour a suitable liquid (such as a silicone oil, or the like) into bore 35 until the bore 35 overflows. Inspection of FIGURE 3 will show that there is no place within body B in which air can be trapped. Thus, the liquid in bore 35 flows around spool 56 and collar 15 into space 7 under diaphragm 2, and up through a groove 29 crossing the ledge 28, and a hole 58 communicating groove 29 with countersink 36, driving air before it. Since, as indicated in FIGURES 1 and 4, there is another groove 29 diametrically opposite and below the first-said groove 29, the liquid will flow through the latter groove into the annular space between the ring 4 and the rim 3, and to the left of O-ring 9. No attempt is made to fit the ring 4 to the recess in which it is received, since O-ring 9 is relied on as a seal, and it is necessary to be sure that there is some leeway provided to accommodate weld 23, hence, said space provides an annular passage freely conducting fluid continuoulsy around the margin of the diaphragm. The lower groove 29 opening into the lowest point of said annular space, the fill liquid enters the latter and flows therethrough to hole 58, driving air before it.

The spaces under diaphragm 102 and around its margin fill with liquid in the same way, that is, liquid flows into the space 107 driving air up through a groove 129 and out through a hole 158, and so on.

While the liquids generally used are relatively free-flowing, it is advisable to reciprocate spool 20 gently, thereby generating, by means of the diaphragms 2 and 102, a kind of pumping action which expedites the distribution of fill liquid and the expulsion of air, until bubbles no longer appear at the openings 58 and 158, and at the top of bore 35. Easy access to the collars 31 and 131, for pumping, is therefore desirable, hence, the diaphragms may be dogged into place by screws, or the like, tapped into body B with the heads thereof lapping over on the rings 4 and 104, short of the gasket grooves 5 and 105, suitable recesses (not shown) in the flanges 1 and 101 being provided by freely receive said heads when the flanges are clamped to body B. One such screw is shown at G in FIGURE 2, and another may be provided diametrically opposite thereto, dogging the other side of ring 104 in place. Ring 4 on the other side of the device would be provided with another such pair of screws. Since screws G assure that rings 4 and 104 remain in place, when flanges 1 and 101 are not assembled to the body B, filling and pumping may take place before assembling the flanges to body B. However, pumping is not essential, though it reduces the time needed for filling and gives a positive indication when all the air has been expelled, namely, at this point, pumping no longer causes air bubbles to appear.

In any event, when liquid overflows bore 35, and all the air is out, block 37, lever 10, etc., may be assembled to the body B. If flanges 1 and 101 were removed, for pumping, these are then assembled to body B also. Lever 10 displaces liquid out of bore 35 up into nipple 45, and when block 37 has been clamped down on the body B, by means of bolts 40, the liquid-containing space in body B is tightly sealed, for, in addition to O-ring 54, block 37 mounts O-rings 59 and 159 in blind holes registering with holes 58 and 158, the O-rings sealing the surface of the bottom of countersink 36 around holes 58 and 158, when the block 37 is screwed down.

The main difference between pour-filling, as practiced in this case, and factory-filling, results from the fact that in the latter, the space to be filled is highly evacuated and the fill-liquid is driven into the said space under the impetus of atmospheric or other higher pressure, while the device is fully assembled (except for the later-to-be-described plug 60). In pour-filling, O-rings 52, 54, 9 and 109, occlude traces of air at atmospheric pressure which may prevent liquid from flowing completely around the O-rings, whereas factory-filling exhausts even these traces and the entry of liquid under atmospheric pressure results in the liquid being driven even into minute crevices in between the O-rings and the structure seating them, which formerly harbored the said traces of air. However, vacuum filling is rather cumbersome since it requires evacuating chambers H and L, as well as the space between diaphragms 2 and 102, in order to prevent undue stress on the diaphragms during the filling process.

Insofar as manufacturing is concerned, the device D may be filled by the usual filling facilities, if convenient. For this purpose, plug 60, mounted in a bore in body B, that is coaxial with bore 35, may be provided. The said plug mounts on O-ring 61 that seals a bore 62 that completes a through passage vertically through body B, useful in practicing the conventional filling techniques. A nut 63 retains plug 60 and the O-ring 61 in place with the latter sealing around the lower end of bore 62. Spool 20 is bored out at 64 to provide a passage transversely through the spool, facilitating upward movement of fluid from the bore 62. Plug 60 need not be disturbed for pour filling and should be tightly in place before pour filling is attempted.

The volume of liquid in a device of this sort is desirably minimized since temperature-caused expansion of the liquid fill stresses the diaphragms, and, if the diaphragms are not identical in their sensitivities to pressure change, produces a net deflection of the force beam 10. However, sufficient clearances must be allowed for movement of spool 20, and other parts, and for permeation of the space within the body with the liquid-fill during pour-filling. In great part, the volume of liquid is determined by how far the diaphragm will be allowed to deflect, the spacing between diaphragms 2 and 102, on the one hand, and the bottoms of their respective recesses 7 and 107, need be just sufficient that the corrugations about touch said bottoms when the O-rings 33 and 133 seal against countersinks 65 and 165 in the body B about bore 21. Thus, if an overly high difference in pressure occurs, one diaphragm will home or nearly home on the bottom of its corresponding recess while the corresponding O-ring 33 or 133 will seal the said recess off from bore 21. As a result, the said diaphragm will be hydraulically supported by liquid trapped under the diaphragm, as if on a rigid body everywhere mating with the diaphragm's corrugated contour, as long as no more liquid can be expelled past the said O-ring to the other side of the device. That is, when pressure difference over-ranges, then one or the other of O-rings 33 and 133, and the corresponding one of countersinks 65 and 165, amount to valve means for cutting off flow (in response to over-range) out of the corresponding one of recesses 7 and 107. At this point, diaphragm stop means is also provided, because the inner surface of the corresponding one of diaphragms 2 and 102 is then rigidly supported at every point thereof.

Our novel differential pressure responsive device, by virtue of its "pour-fillability," so to speak, the manner of mounting and balancing the diaphragms, and the manner of taking diaphragm motion out of the device by means of a lever passing through an O-ring seal and restrained by a stay plate, gives its user complete freedom of field service, even if total disassembly be involved, allows parts to be replaced, liquid-fill to be replenished, and so on, with confidence that the re-assembled device will be behaving very nearly as well as when it was purchased new, and that the worst that could happen would be that one or another of nuts 31 and 131 might have to be replaced to balance the diaphragms (because one may have been replaced, perhaps).

Having presented in the foregoing, a complete and thorough description of our invention in pressure responsive devices, as to the structure and use of the best mode thereof known to us thus far, we claim:

1. In a pressure responsive device, a spring-material diaphragm having a closed corrugation; a ring having a flat end face, said ring being juxtaposed to said corrugation with said end face facing the concave side of said corrugation all around the said corrugation; the inner periphery of said end face being defined by a sharp edge, all around the said ring, said diaphragm being sealed to said ring, all around the outer periphery thereof at said end face, and means maintaining said corrugation in contact with said sharp edge, substantially continuously along said sharp edge.

2. In a pressure responsive device, a spring-material diaphragm having a closed corrugation; a ring having a flat end face, said ring being juxtaposed to said corrugation with said end face facing the concave side of said corrugation all around the said corrugation; the inner periphery of said end face being defined by a sharp edge, all around the said ring, said diaphragm being sealed to said ring, all around the outer periphery thereof at said end face; means maintaining said corrugation in contact with said sharp edge, substantially continuously along said sharp edge, said means including a body having a recess therein receiving said ring, with the convex side of said corrugation substantially everywhere in contact with the bottom of said recess; flange means secured to said body in contact with said ring on the other side thereof from said end face; clamping means, said clamping means forcing said flange means toward said body such as to substantially flatten out said corrugation and force said sharp edge thereagainst; there being a first bore in said body, said first bore opening at one end at the bottom of said recess; there being a second bore in said body, said second bore opening at one end into said first bore and at the other end thereof at the exterior surface of said body; a spool in said first bore, said spool being reciprocable therealong and secured at one end to the central portion of said diaphragm; a rigid lever in said second bore, said rigid lever having one end connected to said spool and the other end projecting out the said other end of said second bore and lying outside said body; a flexible gasket in said other end of said second bore sealingly surrounding said lever; a rigid collar surrounding said lever and rigidly secured to said body, said collar having a pair of stiff webs each integrally secured to itself and to said lever, said webs lying along opposite end portions of a diameter of said collar, whereby to form a stiff torsional fulcrum for said lever substantially preventing intrusion and extrusion of said lever respectively into and from said body, and means limiting flexing of said diaphragm to a range within the capacity of said diaphragm for linear deflection with respect to the fluid pressure on the surfaces thereof.

3. The invention of claim 2, including a ledge in said recess of said body, said ledge extending along the convex side of said corrugation and having a pair of notches therein; one said notch being at the lowest point of said ledge and the other said notch being at the highest point of said ledge, when said body is in a position such that said other end of said second bore is directly over the said first thereof with respect to the vertical; the outer periphery of said diaphragm, and the outer periphery of said ring at said outer periphery of said diaphragm, being spaced from the side of said recess continuously around said recess, whereby to define an annular space around said ring; said notches each opening into said annular space; and there being a passageway in said body communicating said annular space and the exterior surface of said body, said passageway extending upwardly from said annular space when said body is in said position; whereby, if said body is placed in said position and liquid be poured into the said other end of said second bore, from the exterior environment, said liquid will flow through said second bore, around said spool, into said first bore, and thence into the space created by said ledge between said diaphragm and the bottom of said recess, filling the last said space and flowing through said notches into said annular space, around said annular space and up through the said passageway and out of said body into said exterior environment.

4. The invention of claim 2, wherein said spool has a collar secured thereto having a flat end face facing said diaphragm, said diaphragm has a second closed corrugation, the convex side of which faces the last said flat end face, said diaphragm being hermetically secured to said collar around the inner periphery of said last said flat end face, and nut means constructed and arranged to substantially flatten the last said corrugation on said last said flat end face, said nut means having a peripheral sharp edge bearing on said corrugation substantially continuously around said last said corrugation.

5. A diaphragm having a closed corrugation, a ring having an end face juxtaposed to said corrugation and straddling the concave side of said corrugation substantially continuously therearound; means having a surface juxtaposed to said corrugation and facing the convex side thereof, clamping elements forcing said means and said ring toward each other so as to flatten out said corrugation, said end face being bounded by a sharp edge continuously therearound and located so as to directly engage the surface of said corrugation on the concave side thereof substantially continuously therearound.

6. In a pressure responsive device having a diaphragm of precisely defined effective area, said diaphragm having a compliant section surrounding a closed inner corrugation and surrounded by a closed outer corrugation, first clamping means having a pair of opposed surfaces arranged to flatten out, between them, said outer corrugation substantially continuously around said outer corrugation, second clamping means having a pair of opposed surfaces arranged to flatten out, between them, said inner corrugation substantially continuously around said inner corrugation; that one of the first said pair of opposed surfaces, that is on the concave side of said outer corrugation, having a continuous sharp edge bearing on the surface of said outer corrugation continuously therearound, said sharp edge being nearer said compliant portion than the remainder of said first clamping means; and that one of the second pair of clamping surfaces, that is on the concave side of said inner corrugation, having a sharp edge bearing on the surface of said inner corrugation continuously therearound, the last said sharp edge being nearer said compliant portion than is the remainder of said second clamping means.

7. The invention of claim 6, wherein said diaphragm is substantially permanently secured to one said clamping means, and the other said clamping means includes a readily replaceable element, incorporating the said sharp edge of said other said clamping means.

8. The invention of claim 7, wherein said other said clamping means is said second clamping means.

9. The invention of claim 7, wherein said element is a nut having an end face, the periphery of which is the said other said sharp edge, and there being a threaded bolt projecting from said diaphragm at a place where it is surrounded by said inner corrugation and on the concave side of said inner corrugation, said nut being threadable along said bolt toward said corrugation with its said end face facing said inner corrugation.

10. Sealing and motion transmitting means for transmitting motion through a wall separating a first fluid pressure region from a second fluid pressure region, said wall having an aperture therethrough, said sealing and motion transmitting means including a closed flange sealingly surrounding said aperture and rigidly clamped to said wall; a pair of stiff webs integral with said flange, said webs projecting therefrom toward each other from opposite sides of said aperture, a lever rigidly secured to the ends of said webs and extending through said aperture, sealing means surrounding said lever and arranged to impede passage of fluid through said aperture along said lever.

11. The invention of claim 10, wherein said sealing means is a resilient O-ring filling the space between said lever and the periphery of said aperture.

12. The invention of claim 10, wherein said sealing means is resilient material surrounding said lever at a location thereon wherein the axis of said lever, as defined by said webs, passes through said resilient material.

13. The invention of claim 10, wherein said wall, in the vicinity of said aperture, includes a sleeve having one end projecting into the first said collar between the ends of said webs, there being a second sleeve secured at one end to said lever and its other end receiving the said one end of the first said sleeve, the said ends of said webs being rigidly secured to said second sleeve, said webs defining a deflecting axis for said lever.

14. A pressure responsive device, said device including in combination, a pair of corrugated diaphragms, a body having a space therein, and said body having passageways communicating with said space, and said passageways having openings at the exterior surface of said body, one of said diaphragms being mounted on said body so as to seal one of said openings from the environment exterior to said body; the other said diaphragm being mounted on said body so as to seal another of said openings from the said environment; a rigid member in said space and having one end thereof rigidly connected to a central portion of one of said diaphragms and another end thereof rigidly connected to a central portion of the other of said diaphragms, a rigid lever having one end thereof connected to said rigid member, and extending out of said body through a third of said openings, said lever being constructed and arranged such that movement of said member moves said lever; sealing means in said third opening and around said lever, and means mounting said lever for substantially preventing motion of said lever save by said member, said sealing means presenting a substantially fluid impervious wall with respect to fluid under pressure; the arrangement being that said space and passageways are substantially everywhere surrounded by rigid structure except at the said diaphragms; the said diaphragms being constructed and arranged and so mounted on said body as to have like sensitivities with respect to fluid pressure incident thereon; a liquid solidly filling substantially the entire free volume of said space and passageways, and means for applying pressures to the external surfaces of said diaphragms whereby to move said rigid member in accordance with the difference in the pressures on the said diaphragm.

15. The invention of claim 14, wherein said body includes stop means in each of the said one and another opening, said stop means being constructed and arranged to prevent motion of said rigid member more than a limited amount in the direction of either of its ends, said stop means including valve means preventing movement of liquid past said rigid means and between the last said openings upon execution by said rigid member of motion in said limited amount in said direction.

16. The invention of claim 14, wherein the last said means includes a pair of stiff webs integrally secured to said lever on diametrically opposite sides thereof and projecting therefrom on a common diameter, and means clamping said webs rigidly to said body at portions of said webs spaced from said lever; and said rigid member and said diaphragms being arranged to exert a torque on said lever about said webs as a pivot when the difference in the pressures on said diaphragms is other than zero.

17. The invention of claim 16, wherein said sealing means is an O-ring compressed between the circumferences of said lever and said third of said openings in the vicinity of said webs.

18. A pour-fill pressure responsive device including a body having a recess, a ledge at the bottom of said recess and surrounding the periphery of said bottom, a ring mounted in said recess; a diaphragm supported in said body and positioned between said ring and said ledge, said diaphragm being sealed to said ring, and the outer periphery of said ring being of such dimension as to define a continuous annular space between the peripheral wall of said recess and the outer periphery of said ring; sealing means in said annular space sealing continuously around said ring for preventing intrusion of fluid from the external environment into said annular space, there being passageways in said ledge communicating the space between said diaphragm and the bottom of said recess with said annular space on the side of said ring to which said diaphragm is sealed.

19. The invention of claim 18, wherein said body includes a further passageway opening at one end into the bottom of said recess, within the confines of said ledge, said further passageway opening at its other end at a place on the exterior of said body located remotely from one of the first said passageways and proximate to another of said first said passageways; the said one and another passageways being spaced along said ledge one from the other, there being a passage inside said body extending between said annular space at a place next said another of said first said passageways to a place next the said other end of said further passageway, and means for sealing off the said passage and the said further passageway at the said exterior of said body.

20. In a pressure responsive device, a spring-material diaphragm having a closed corrugation; a ring having a flat end face, said ring being juxtaposed to said corrugation with said end face facing the concave side of said corrugation all around the said corrugation; the inner periphery of said end face being defined by a sharp edge, all around the said ring, said diaphragm being sealed to said ring, all around the outer periphery thereof at said end face, and means maintaining said corrugation in contact with said sharp edge, substantially continuously along said sharp edge, said means also flattening said corrugation sufficiently to cause said sharp edge to contact said corrugation substantially all around said corrugation; said means including a body having a recess therein receiving said ring, with the convex side of said corrugation substantially everywhere in contact with the bottom of said recess, flange means secured to said body in contact with said ring on the other side thereof from said end face, and clamping means, said clamping means forcing said flange means toward said body such as to substantially flatten out said corrugation and force said sharp edge thereagainst.

No references cited.

RICHARD B. WILKINSON, *Primary Examiner.*
KARL J. ALBRECHT, *Examiner.*